United States Patent [19]
Maughan et al.

[11] Patent Number: 5,772,337
[45] Date of Patent: Jun. 30, 1998

[54] POLYWEDGE BEARING FOR USE WITH BALL AND SOCKET

[75] Inventors: Garth B. Maughan, Delta; Terry D. Peppers, Columbus, both of Ohio

[73] Assignee: Dana Corporation, Toledo, Ohio

[21] Appl. No.: 847,238

[22] Filed: May 1, 1997

[51] Int. Cl.[6] ................................................ F16C 11/06
[52] U.S. Cl. ....................... 384/206; 384/208; 403/137; 403/140
[58] Field of Search .................................... 384/206, 208, 384/209, 210; 403/122, 124, 135, 137, 140

[56] References Cited

U.S. PATENT DOCUMENTS

| | | | |
|---|---|---|---|
| 2,733,085 | 1/1956 | Latzen | 287/87 |
| 3,367,728 | 2/1968 | Labbie | 384/208 |
| 3,486,778 | 12/1969 | Herbenat et al. | 287/87 |
| 3,687,509 | 8/1972 | Schweizer | 384/210 |
| 3,787,127 | 1/1974 | Cutler | 403/133 |
| 3,856,423 | 12/1974 | Uchida | 403/140 |
| 4,076,344 | 2/1978 | Gaines et al. | |
| 4,318,627 | 3/1982 | Morin | 403/133 |
| 4,430,016 | 2/1984 | Matsuoka et al. | 403/40 |
| 4,577,988 | 3/1986 | Gollub et al. | 403/140 |
| 4,577,989 | 3/1986 | Ito | 403/140 |
| 4,591,276 | 5/1986 | Schneider et al. | 384/206 |
| 4,690,581 | 9/1987 | Umemoto et al. | 403/133 |
| 4,875,794 | 10/1989 | Kern, Jr. | 403/137 X |
| 4,971,473 | 11/1990 | Schafer et al. | 403/140 |
| 5,395,176 | 3/1995 | Zivkovic | 403/137 X |
| 5,564,853 | 10/1996 | Maughan | 403/117 |

FOREIGN PATENT DOCUMENTS 1417407  12/1975  United Kingdom.

Primary Examiner—Thomas R. Hannon
Attorney, Agent, or Firm—Rader, Fishman & Grauer PLLC

[57] ABSTRACT

A bearing set for a ball and socket joint comprises an inner and outer bearing with a head of a ball stud engaging a spherical inner seat face of each of the bearings. An axial compression pre-load results when the bearing set and ball stud are inserted into a socket and the socket is closed. To prevent the over compression of the bearings and undesirable plastic deformation, a plurality of wedge shaped slots extend about each bearing between an outer axial surface and an outer peripheral surface. The slots provide material "flow" which eliminate unwanted plastic deformation by placing pre-load force and the natural material elasticity into a desired equilibrium. The tailored "cushioning" effect remains while still providing adequate compression pre-loading and dynamic stability to the ball stud.

22 Claims, 2 Drawing Sheets

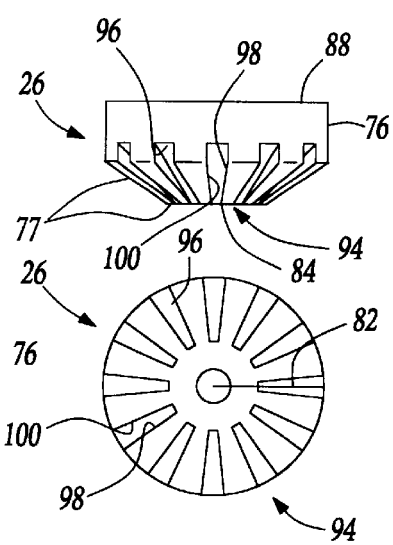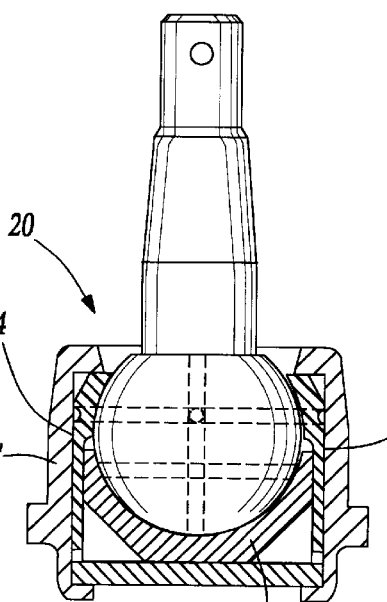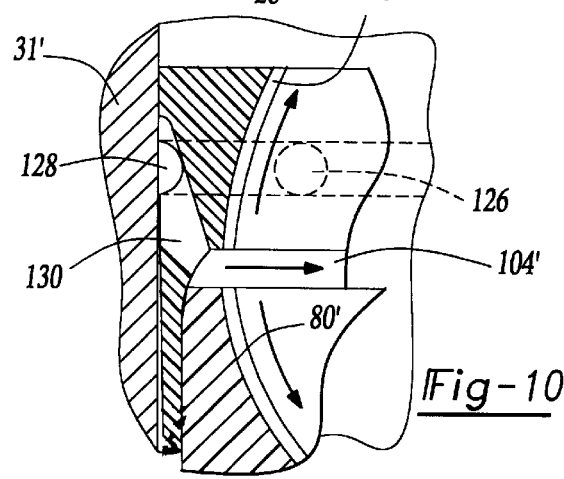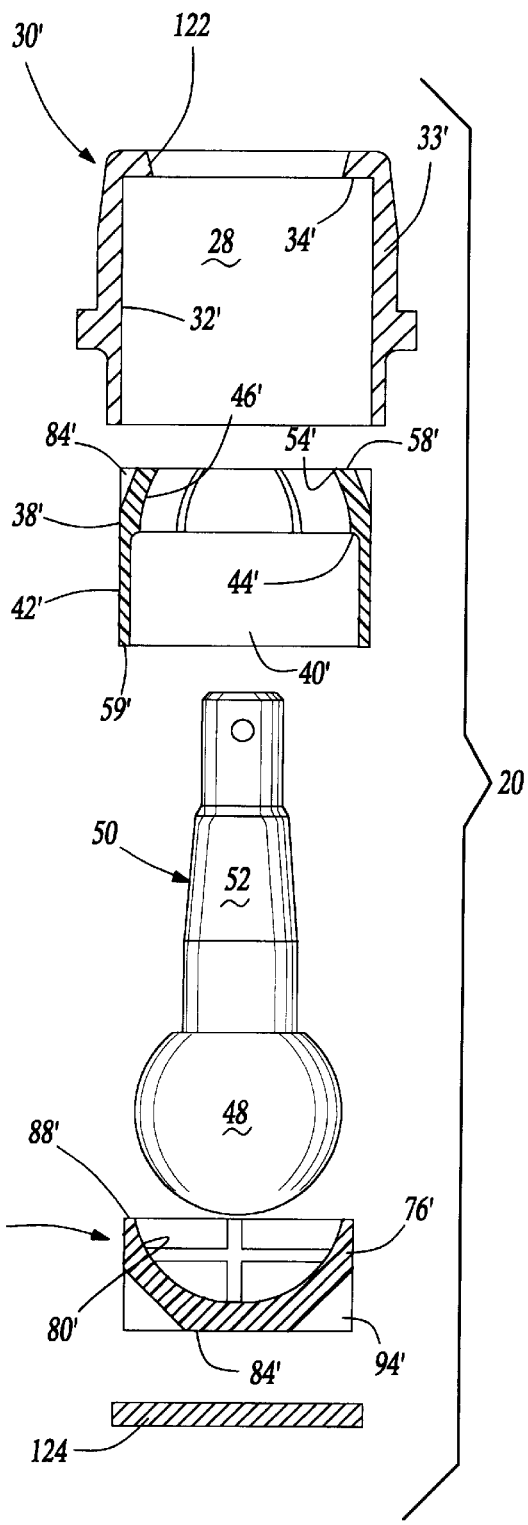

POLYWEDGE BEARING FOR USE WITH BALL AND SOCKET

FIELD OF THE INVENTION

The present invention relates to a ball and socket joint assembly for a wide range of applications, comprising a two-piece bearing set that engages a head of a ball stud when retained within a socket under a compression pre-load and having a mechanism to control the amount of compression pre-load.

BACKGROUND OF THE INVENTION

Ball and socket joints are used in a variety of applications, including rack and pinion inner tie rod socket assemblies, steering knuckles, drag links, and connecting rod assemblies. Ball and socket joints typically include a generally cylindrical socket member adapted to receive a bearing together with a head of a ball stud. The bearing reduces the level of friction between the socket and ball stud head while frequently adapting to the looseness between the stud and socket member resulting over time from wear.

Ball and socket joints including bearings have been subjected to many disadvantages. In particular, assembly is difficult. Typically, the stud head must be forced into the bearing, and in turn the bearing then forced into the socket. Cracked bearings have resulted during assembly, particularly when very rigid, stiff, inelastic materials are used. Further, the bearings of such joints can adapt for only limited wear, resulting in joint failure as stud head rotating torque decreases and axial end play increases.

In U.S. Pat. No. 5,564,853, a bearing set for a ball and socket joint is disclosed which comprises an outer bearing and an inner bearing with a head of the ball stud engaging a spherical inner seat face of each of the bearings. A compression pre-load is applied when the inner bearing is inserted into a cavity of the outer bearing, a cylindrical outer wedge surface of the inner bearing having a greater diameter than a corresponding diameter of an inner skirt defining the cavity of the outer bearing. The bearing set is subjected to additional compression pre-load when the bearing set and ball stud are inserted into a socket and the socket is then closed.

The use of such a two-piece bearing set promotes easier joint assembly and results in a tight joint. However, an excessive compression pre-load may be applied such that the bearing plastically deforms. When a bearing is plastically deformed there is a lack of balance between elasticity or shock absorption and compressibility or torque control.

SUMMARY OF THE INVENTION

The present invention relates to an improved ball and socket joint which includes a two-piece bearing set that promotes easy joint assembly and results in a joint that has a proper balance between shock absorption or elasticity and compressibility or torque control while simultaneously reducing the need for extremely high tolerances.

The two-piece bearing set comprises annular bearings with opposing axial surfaces and a spherical inner seat face. An annular outer bearing includes a generally cylindrical inner skirt that defines a cavity. The spherical inner seat face engages a head of a ball stud. A radial compressive pre-load is applied when an inner bearing is inserted into the cavity of the outer bearing such that the spherical inner seat face of the inner bearing engages the head of the ball stud. The inner bearing has a generally cylindrical outer peripheral surface with an unloaded diameter greater than a corresponding unloaded diameter of the inner skirt.

The bearing set is retained within an annular socket and the socket then sealed to apply an axial compression pre-load upon both bearings. To prevent the application of so much compression pre-load that the bearing plastically deforms, each of the bearings include an outer axial surface with a plurality of slots between the outer axial surface and the outer peripheral surface. The slots deform upon compression, thereby allowing material "flow" to eliminate unwanted plastic deformation by placing pre-load force and the natural material elasticity into a desired equilibrium. Yet, sufficient material remains to provide a tailored cushioning effect with adequate compression pre-loading and dynamic stability to the ball stud.

Each of the slots include opposing side walls and a floor defined between the side walls and extending between the outer peripheral surface and the outer axial surface. An inner peripheral extent of each slot is spaced away from and does not intersect the spherical seat face of the bearing or the opposing axial surface of the bearing. Preferably, each slot is circumferentially spaced from and unaligned with an axially extending lubrication groove formed in the spherical seat face of a bearing. Otherwise, assembly performance may be compromised.

In a preferred embodiment each of the side walls define a constant thickness between a radially outermost point and a radially innermost point before being compression pre-loaded. Alternatively, each of the slots span an equal number of degrees between a radially outermost point and a radially innermost point before being compression pre-loaded.

BRIEF DESCRIPTION OF THE DRAWINGS

The features and inventive aspects of the present invention will become more apparent upon reading the following detailed description, claims, and drawings, of which the following is a brief description:

FIG. 4 is a planar view of the joint of the first embodiment.

FIG. 6 is a planar view of the inner bearing of the first embodiment.

FIG. 8 is a cross-sectional view of a second embodiment of the present invention.

FIG. 9 is an exploded cross-sectional view of the various embodiments showing the joint components.

FIG. 10 is an enlarged cross-sectional view of a portion of the second embodiment.

DETAILED DESCRIPTION OF A PREFERRED EMBODIMENT

Figure 1:
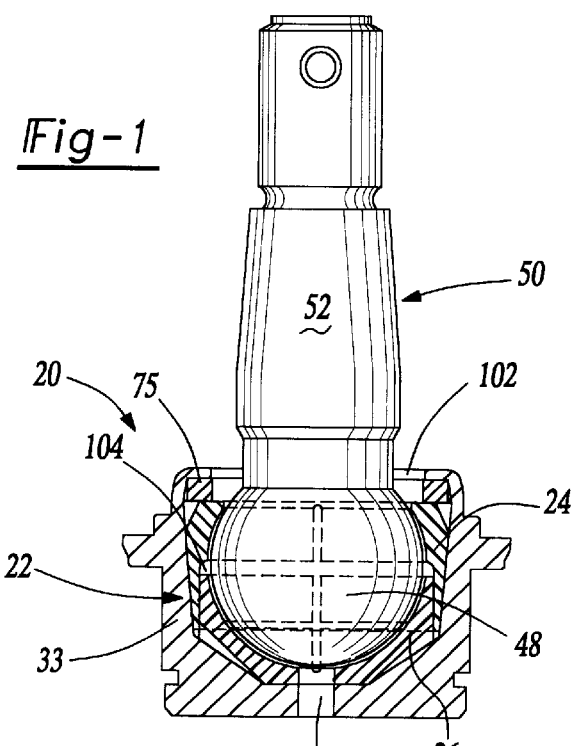
FIG. 1 is a cross-sectional view of a first embodiment of the ball and socket joint of the present invention.
Figure 3:
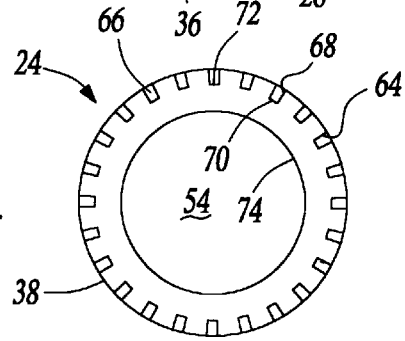
FIG. 3 is a planar view of the outer bearing of the first embodiment.
Figure 4:
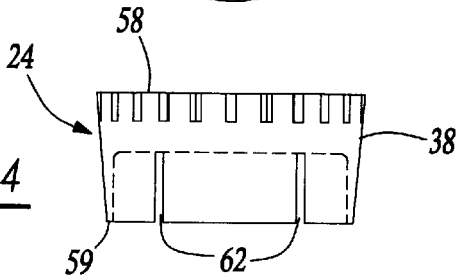
FIG. 4 is a side view of the outer bearing of the first embodiment.
Figure 5:
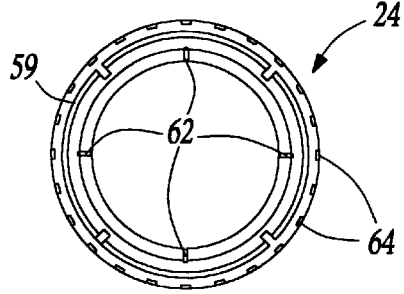
FIG. 5 is a side view of the inner bearing of the first embodiment.
Figure 2:
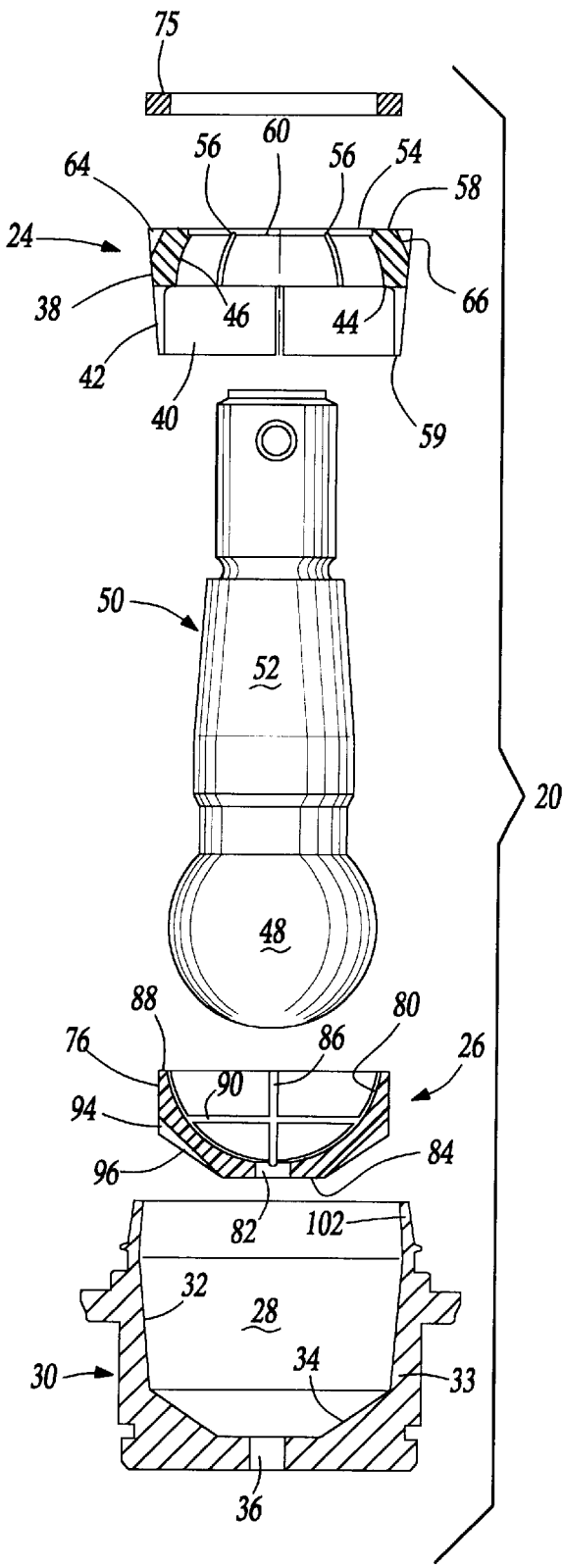
FIG. 2 is a cross-sectional exploded view of the first embodiment showing the various joint components.

A re-greaseable, top closure ball and socket joint 20 is shown in FIGS. 1 through 6 which includes a two-piece bearing set 22 comprising an annular outer bearing 24 and an annular inner bearing 26. Bearings 24 and 26 are received in a cavity 28 of a socket 30. Cavity 28 is defined by an inner peripheral surface 32 of a socket side wall 33 and a frusto-conical floor 34. Cavity 28 extends axially about an axis of symmetry. An opening 36 is formed in the center of floor 34 which receives a grease fitting (not shown) for re-greasing joint 20.

Outer-bearing 24 includes an outer peripheral surface 38 which is adapted to conform to inner peripheral surface 32 of cavity 28. A cavity 40 is defined within outer bearing 24 by a generally cylindrical inner skirt 42 which extends about the axis of symmetry of housing cavity 28. A transition zone 44 separates cavity 40 from a spherical inner seat face 46 that engages a spherical stud head 48 of a ball stud 50 and defines an inner peripheral surface of bearing 24. A shank 52 of ball stud 50 passes through an aperture 54 formed in bearing 24 such that stud head 48 engages seat face 46. To aid in lubrication, face 46 may include a plurality of axially extending lubrication grooves 56 extending from transition zone 44 to an upper axial surface 58 including aperture 54 and at least one circumferentially extending lubrication groove 60 adjacent surface 52. Outer bearing 24 may include optional slots 62 which extend from transition zone 44 to terminate an opposing axial surface 59. Slots 62 provide improved radial elasticity to outer bearing 24.

Bearing 24 also includes a plurality of circumferentially spaced wedge shaped slots 64 defined between upper axial surface 58 and peripheral surface 38. Each slot 64 includes a floor 66, parallel opposing side walls 68 and 70 generally perpendicular to floor 66, and an inner peripheral wall 72 spaced radially outward from an inner periphery 74 of aperture 54. Floor 66 extends at a generally constant angle between surfaces 58 and 38 and is spaced from face 46. Preferably, each slot 64 either defines a constant width between side walls 68 and 70 or spans an equal number of degrees between a radially outermost point and a radially innermost point before being compression pre-loaded. Wall 72 is spaced away from and does not intersect an inner periphery 74 of aperture 54.

Upper axial surface 58 acts as a compression rim to engage an annular retaining ring 75. Retaining ring 75 is generally formed from steel.

Inner bearing 26 is radially compression pre-loaded by being forced into cavity 40 of outer bearing 24. Inner bearing 26 includes a generally cylindrical outer peripheral surface 76, a unloaded diameter of which is greater than the corresponding unloaded diameter of inner skirt 42 of outer bearing 24. Inner bearing 26 also includes a generally frusto-conical nose 77. To promote the mating of inner and outer bearings 24 and 26, both outer peripheral surface 76 and inner skirt 42 may both be wedge shaped. Further, the outer and inner bearing edges are optionally slightly radi-used. Inner bearing 26 has a spherical inner seat face 80 which engages stud head 48 after the inner bearing is mated with outer bearing 26. Faces 46 and 80 share a common diameter and secure head 48 to limit its degrees of freedom to rotational motion about a common center point.

To aid in lubrication, nose 77 of inner bearing 26 has an opening 82 aligned with opening 36 in socket 30 about the symmetrical axis of the joint extending axially between face 80 and a lower axial surface 84. A plurality of lubrication grooves 86 formed within face 80 extend axially between opening 82 and an upper axial surface 88. At least one circumferentially extending lubrication groove 90 intercepts grooves is 86.

Bearing 26 also includes a plurality of circumferentially spaced wedge shaped slots 94 defined between lower axial surface 84 and outer peripheral surface 76. Each slot 94 includes a floor 96 and opposing parallel side walls 98 and 100 generally perpendicular to floor 96. Floor 96 extends at a generally constant angle between surfaces 84 and 76. The innermost radial extent of each slot 94 is spaced radially outward from opening 82. Preferably, each slot 94 has a constant width between side walls 98 and 100 or spans an equal number of degrees between a radially innermost and a radially outermost point before being compression pre-loaded.

A cross-sectional view of the assembled ball and socket joint 20 is illustrated in FIG. 1. First the ball stud shank 52 is passed through aperture 54 of outer bearing 24 such that the ball stud contacts face 46. Then inner bearing 26 is mated with the outer bearing. The subassembly is inserted into cavity 28 of socket 30. The joint is sealed by closing socket 30. Socket 30 is typically a forging or a casting. An annular lip 102 of socket 30 is crimped about retaining ring 75. Lip 102 is sized to ensure adequate resistance against severe loading "push out." Further, when socket 30 is closed, an axial load is applied to retaining ring 75 which is transferred to upper axial surface 58 of outer bearing 24 to provide axial compression pre-loading to both bearings 24 and 26. The axial compression pre-load is carried through outer bearing 24 over face 46 and transferred through stud head 48 to corresponding face 80 of inner bearing 26 and through the inner bearing to nose 77. Finally, the load is then transferred from inner bearing 26 to floor 34 socket 30. The radial compression pre-load is carried between outer surface 76 of inner bearing 26 to inner skirt 42, and from the inner skirt 42 to inner peripheral surface 32 of socket 30.

As noted above, nose 77 has a frusto-conical shape that permits easier molding of the bearing. More important, however, a nose 77 which conforms to and is in facial contact with a corresponding floor 34 of socket 30 provides greater load support because of an increased bearing surface area, less axial end play and radial lash, and improved joint tightness without increasing rotating torque values.

An annular pocket 104 is formed between outer bearing 24 and inner bearing 26 that is generally parallel to lubrication grooves 60 and 90. As best shown in FIG. 1, pocket 104 is formed by transition zone 44 and inner skirt 42 of outer bearing 24 together with inner bearing 26 and head 48. Pocket 104 functions as a lubricant well.

Preferably both bearings 24 and 26 are semi-rigid, allowing constant selfadjustment (or "take up") for wear, however small, occurring between head 48 and corresponding faces 46 and 80. As wear takes place, some compression pre-loading of the bearings is released while still maintaining zero axial or radial play of the bearings 24 and 26, and head 48 within socket 30. Thus, joint 20 can handle high radial and axial load forces over an extended life.

Joint 20, is applicable to a wide range of applications, including, but not limited to, rack and pinion inner and outer tie rod socket assemblies, upper and lower suspension ball joint assemblies, drag links and connecting rod assemblies, and other "ball and socket" steering knuckles. Inner and outer bearings 22 and 24 may be formed from a wide range of materials, depending on the individual application and the appropriate internal assembly force retention required during joint usage. Possible semi-rigid bearing materials include polyethylene terephthalate; aramid aromatic polyamide polymer fiber, sold under the trade name "KEVLAR", and combined with 6,6 polyamide, sold under the trade name "NYLON"; 6,6 polyamide, sold under the trade name "NYLON", and combined with a lubricant such as molybdenum disulfide, and sold under the trade names "NYLA-TRON" and "MDS NYLON"; polyformaldehyde (polyacetal) polymer in oxymethylene linear structure with attached ester or ether terminal groups and sold under such trade names as "DELRIN" and "CELCON"; linear, amorphous polyester (polycarbonate); polymerized acrylonitrile-butadiene-styrene, sold under the trade name "ABS"; linear polyurethane elastomer in a high density, 75 "Shore D" hardness range, sold under the trade name "POLYURETHANE"; ultrahigh molecular weight polyethylene; chlorinated-polyvinyl-chloride; ethylene-hexene-1copolymer, sold under the trade name "MARLEX"; polytetrafluoroethylene (filled); polypropylene (polyolefin); and polyformaldehyde polymer filled with polytetrafluoroethylene fibers, sold under the trade name "Delrin-AF".

It has proven to be very difficult to precisely control the level of axial and radial compression. Efforts to control compression through the use of tight tolerances between bearings 24 and 26 or between the bearings and socket 30 have proven to be of limited effectiveness. Thus, there has been a tendency to overly compress bearings 24 and 26, resulting in plastic deformation of the bearings and reduced joint performance. Slots 64 of outer bearing 24 and slots 94 of inner bearing 26 have been found to be highly successful in addressing the need for a balance between shock absorption or elasticity and compressibility or torque control while simultaneously reducing the need for extremely high tolerances. Thus, both manufacturability and performance are enhanced while costs are reduced.

The number, spacing, and both the axial and radial extent of the slots depends on the particular application. However, it has generally been found to be highly desirable to have the slots extend at an angle from an outer peripheral surface to an outer axial surface of the bearing. Enough material must be removed to allow material "flow" and resulting slot deformation during both radial and axial compression pre-loading to eliminate unwanted plastic deformation by placing pre-load force and the natural material elasticity into a desired equilibrium. Yet, sufficient material must remain to provide a tailored cushioning effect with adequate compression pre-loading and dynamic stability to the ball stud. Thus, no slot should be aligned with an axially extending lubrication groove formed in the spherical seat face of a bearing. Otherwise, assembly performance may be compromised.

In the illustrated embodiment there are numerous slots 64 associated with outer bearing 24. However, no one slot extends a significant extent radially or axially into the bearing because of the limitations imposed by aperture 54 and face 46. Significant material is required between floor 66 and both aperture 54 and face 46 or the bearing will lose structural integrity. Therefore, the number of slots is greater than that associated with slots 94 of outer bearing 26 where the radial and axial extent of each slot is greater because there is more material between outer periphery 76 and spherical seat face 80.

An alternative embodiment of the present invention, a ball and socket joint 20' is shown in FIGS. 8 through 10. Joint 20' includes a bearing set 22' with an annular outer bearing 24' and an annular inner bearing 26' which are received in a cavity 28' or a socket 30', cavity 28' defined by a side wall 33'.

Bearing set 22' is very similar to bearing set 22. Outer bearing 24' includes an outer peripheral surface 38' which is adapted to conform to an inner peripheral surface 32' of cavity 28. A cavity 40' is defined by a generally cylindrical inner skirt 42' A transition zone 44' separates cavity 40' from a spherical inner seat face 46' that is adapted to receive a spherical stud head 48' of a ball stud 50 and defines an inner peripheral surface of bearing 24' A shank 52 of ball stud 50 passes through an aperture 54' formed in bearing 24' such that stud head 48' engages seat face 46'. Bearing 24' also includes a plurality of circumferentially spaced wedge shaped slots 64' defined between upper surface 58' and peripheral surface 38'.

Inner bearing 26' is compression pre-loaded by being forced into cavity 40' of outer bearing 24'. Inner bearing 26' includes a generally cylindrical outer peripheral surface 76', an unloaded diameter of which is greater than a corresponding unloaded diameter of inner skirt 42' of outer bearing 24'. Inner bearing 26' has a spherical inner seat face 80' which engages stud head 48 after the inner bearing is mated with outer bearing 26'. Bearing 26' also includes a plurality of circumferentially spaced wedge shaped slots 94' defined between surface lower surface 84' and outer peripheral surface 76'.

A cross-sectional view of the assembled ball and socket joint 20' is illustrated in FIG. 8. First, the ball stud shank 52 is passed through aperture 54' of outer bearing 24' such that the ball stud contacts face 46'. Then inner bearing 26' is mated with the outer bearing. The subassembly is inserted into cavity 28' of socket 30'. Socket 30' includes a floor 34' with an aperture 122. Shank 52 passes through aperture 122 and upper surface 58' of outer bearing 24' engages floor 34'. Once the subassembly is correctly positioned, a solid retaining ring 124 is inserted into cavity 28' and engages surface 84' of inner bearing 26'. Ring 124 has a diameter generally corresponding to the diameter of cavity 28'. To provide additional surface area of contact between a lower axial surface 84' and ring 124, inner bearing 26' lacks a frusto-conical nose. Lower axial surface 84' of inner bearing 26' extends slightly beyond a lower outer axial surface 59' of outer bearing 24' to permit compression of bearing set 22' without interference from the outer bearing. When socket 30' is closed, an axial load is applied to retaining ring 124 which is transferred through bearing set 22' and to floor 34' to apply a compression pre-load to the bearing set.

An advantage of assembly 20' is that there are no fluid flow openings 36 and 82 such as that shown in assembly 20 which might interfere with the desired compression pre-loading of bearing set 22'. Instead, as shown in FIG. 10, socket 30' includes an opening 126 extending through side wall 31' which intercepts an aligned groove 128. Groove 128 extends about the entire outer peripheral surface 38' of outer bearing 24'. In turn, groove 128 intercepts a passageway 130 formed through outer bearing 24' which intercepts an annular pocket 104' formed between outer bearing 24' and inner bearing 26'. Any grease added to assembly 20' by means of opening 126 follows the pathway shown by the arrows in FIG. 10. Alternatively, passageway 130 could intercept a separate lubrication groove formed in the inner periphery of spherical seat face 46'. As best shown in FIG. 8, both bearings 24' and 26' may include circumferentially and axially extending lubrication grooves of the type discussed with respect to socket assembly 20 above to provide necessary lubrication between bearing set 22' and head 48.

The disclosed embodiments and examples are given to illustrate the present invention. However, they are not meant to limit the scope and spirit of the present invention. Therefore, the scope of the present invention should be considered by reviewing the appended claims.

What is claimed is:

1. An annular bearing for use in a ball and socket joint comprising an outer peripheral surface, two opposing axial surfaces, a spherical inner seat face, and a plurality of wedge shaped slots extending about said bearing between said outer peripheral surface and one of said outer axial surfaces, each of said slots including opposing parallel side walls and a floor defined between and generally perpendicular to said side walls and extending at a generally constant angle between said outer peripheral surface and said one of said outer axial surfaces.

2. An annular bearing as recited in claim 1, wherein said slots are spaced away from and do not intersect said face.

3. An annular bearing as recited in claim 2, wherein at least one axially extending lubrication groove is formed in said spherical inner seat face, said slots circumferentially spaced from and unaligned with said lubrication groove.

4. An annular bearing as recited in claim 2, wherein said slots are spaced away from the other of said axial surfaces.

5. An annular bearing as recited in claim 4, wherein an aperture is formed through said one of said axial surfaces of said bearing, said slots spaced away from said aperture.

6. An annular bearing as recited in claim 5, wherein said slots are equally spaced about said bearing.

7. An annular bearing as recited in claim 1, wherein each of said side walls of said slots define a constant width between a radially outermost point and a radially innermost point before being compression pre-loaded.

8. An annular bearing as recited in claim 1, wherein each of said slots span an equal number of degrees between a radially outermost point and a radially innermost point before being compression pre-loaded.

9. A ball and socket joint comprising:
   a socket with an inner peripheral surface;
   two bearings axially compressed within said socket, each of said bearings comprising an outer peripheral surface, two opposing axial surfaces, a spherical inner seat face, and a plurality of slots extending between said outer peripheral surface and one of said outer axial surfaces;
   a ball stud with a stud head and shank, said stud head engaging said seat face; and
   a closure to axially compress and retain said bearings and said spherical stud head within said socket.

10. A ball and socket joint as recited in claim 9, wherein each of said slots including opposing side walls and a floor defined between said side walls and extending between said outer peripheral surface and said one of said outer axial surfaces.

11. A ball and socket joint as recited in claim 10, wherein each of said slots span an equal number of degrees between a radially outermost point and a radially innermost point before being compression pre-loaded.

12. A ball and socket joint as recited in claim 11 wherein bearing includes a lubrication groove, said groove aligned with said opening.

13. A ball and socket joint as recited in claim 10, wherein an inner peripheral extent of said slots are spaced away from and do not intersect said face and wherein said slots do not intersect the other of said axial surfaces.

14. A ball and socket joint as recited in claim 10, wherein each of said side walls of said slots define a constant thickness between a radially outermost point and a radially innermost point before being compression pre-loaded.

15. A ball and socket joint as recited in claim 9, wherein at least one axially extending lubrication groove is formed in at least one spherical seat face, said slots circumferentially spaced from and unaligned with said lubrication groove.

16. A ball and socket joint as recited in claim 9, wherein said socket includes a side wall, an opening extending through said side wall.

17. A ball and socket joint comprising:
   a socket;
   an outer bearing axially compressed within said socket, said outer bearing comprising an outer peripheral surface conforming to said inner peripheral surface of said socket, two opposing axial surfaces, a first spherical inner seat face, a generally cylindrical inner skirt that defines a cavity and a first plurality of slots extending about said outer bearing between said outer peripheral surface and one of said outer axial surfaces, each of said first plurality of slots including opposing side walls and a floor defined between said side walls and extending between said surfaces;
   an inner bearing received in said outer bearing, said inner bearing comprising an outer peripheral surface conforming to said inner skirt of said outer bearing, two opposing axial surfaces, a second spherical inner seat face, and a second plurality of slots extending about said inner bearing between said outer peripheral surface and one of said outer axial surfaces, each of said second plurality of slots including opposing side walls and a floor defined between said side walls and extending between said surfaces;
   a ball stud with a stud head and shank, said stud head engaging each of said seat faces; and
   a closure to retain said outer and inner bearings and said spherical stud head within said socket, wherein said bearings are axially compressed within said socket.

18. A ball and socket joint as recited in claim 17, wherein said inner bearing is radially compression loaded within said cavity of said outer bearing.

19. A ball and socket joint as recited in claim 17, wherein an unloaded diameter of said outer peripheral surface of said inner bearing is greater than a corresponding unloaded diameter of said inner skirt of said outer bearing.

20. A ball and socket joint as recited in claim 19, wherein said outer peripheral surface of said inner bearing and said inner skirt of said outer bearing are generally wedge shaped.

21. ball and socket joint as recited in claim 19, wherein each of said slots is spaced away from an innermost surface of said corresponding bearing, does not intersect said corresponding face and is spaced away from the other of said corresponding axial surfaces.

22. A ball and socket joint as recited in claim 19, wherein one of said bearings include at least one axially extending lubrication groove, said slots of said one of said bearings circumferentially spaced from and unaligned with said lubrication groove.

* * * * *